(12) United States Patent
Einberg (10) Patent No.: US 10,152,838 B2
(45) Date of Patent: *Dec. 11, 2018

(54) USING SENSOR DATA TO AUTHENTICATE A USER (71) Applicant: ASSA ABLOY AB, Stockholm (SE)

(72) Inventor: Fredrik Einberg, Huddinge (SE)

(73) Assignee: ASSA ABLOY AB (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/532,652

(22) PCT Filed: Dec. 2, 2015

(86) PCT No.: PCT/EP2015/078399
§ 371 (c)(1),
(2) Date: Jun. 2, 2017

(87) PCT Pub. No.: WO2016/087540
PCT Pub. Date: Jun. 9, 2016

(65) Prior Publication Data
US 2017/0372549 A1 Dec. 28, 2017

(30) Foreign Application Priority Data
Dec. 4, 2014 (EP) .................... 14196308

(51) Int. Cl.
G06F 21/34 (2013.01)
G07C 9/00 (2006.01)
(Continued)

(52) U.S. Cl.
CPC .......... G07C 9/00309 (2013.01); B60R 25/24 (2013.01); G06F 21/32 (2013.01);
(Continued)

(58) Field of Classification Search
CPC ..... G07C 9/00309; G06F 21/40; G06F 21/34; G06F 21/32; B60R 25/24; H04W 12/06;
(Continued)

(56) References Cited

U.S. PATENT DOCUMENTS 8,040,218 B2 * 10/2011 Hays .................. G07C 9/00309
340/5.73
8,085,170 B2 * 12/2011 Li ........................... G06F 3/023
340/407.2
(Continued)

FOREIGN PATENT DOCUMENTS

DE 10 2012 220130 A1 5/2013
DE 102012220130 5/2013
(Continued)

OTHER PUBLICATIONS

U.S. Appl. No. 15/532,674, filed Jun. 2, 2017, Einberg et al.
(Continued)

Primary Examiner — Brian Miller
(74) Attorney, Agent, or Firm — Sheridan Ross P.C.

(57) ABSTRACT

It is presented a method for conditionally authenticating a user for access to a physical space. The method is performed in an access control device connected to a physical lock device. The method comprises the steps of: obtaining first sensor data being based on a mobile device sensing a tap of a user; obtaining second sensor data being based on a fixed sensor sensing a tap of a user; determining whether the first sensor data matches the second sensor data by determining whether the first sensor data reflects a tap of the user and corresponds to a tap of the user also reflected in the second sensor data; and sending an unlock signal to the physical lock device when the first sensor data matches the second sensor data.

14 Claims, 5 Drawing Sheets (51) Int. Cl.
*B60R 25/24* (2013.01)
*G06F 21/32* (2013.01)
*G06F 21/40* (2013.01)
*H04W 12/06* (2009.01)
*G06F 3/01* (2006.01)
*H04L 29/06* (2006.01)
*H04W 12/08* (2009.01)

(52) U.S. Cl.
CPC .............. *G06F 21/34* (2013.01); *G06F 21/40* (2013.01); *H04W 12/06* (2013.01); *G06F 3/017* (2013.01); *H04L 63/0853* (2013.01); *H04L 63/0861* (2013.01); *H04L 2463/082* (2013.01); *H04W 12/08* (2013.01)

(58) Field of Classification Search
CPC ............... H04W 12/08; H04L 63/0861; H04L 63/0853; H04L 2463/082
See application file for complete search history.

(56) References Cited

U.S. PATENT DOCUMENTS

| | | |
|---|---|---|
| 8,593,249 B2 | 11/2013 | Bliding et al. |
| 9,450,682 B2* | 9/2016 | Herman ................. H04B 11/00 |
| 9,740,838 B2* | 8/2017 | Hill ......................... G06F 21/32 |
| 2008/0136678 A1 | 6/2008 | Harrington |
| 2009/0083847 A1* | 3/2009 | Fadell ................... G06F 21/316 726/16 |
| 2010/0218249 A1 | 8/2010 | Wilson et al. |
| 2013/0127591 A1 | 5/2013 | Shay et al. |
| 2014/0283013 A1 | 9/2014 | Marco et al. |
| 2014/0325614 A1 | 10/2014 | Rhelimi |
| 2015/0213244 A1* | 7/2015 | Lymberopoulos ...... G06F 21/32 726/18 |
| 2016/0277925 A1* | 9/2016 | Bengtsson ............. H04B 11/00 |
| 2016/0342781 A1* | 11/2016 | Jeon ........................ G06F 21/32 |

FOREIGN PATENT DOCUMENTS

| | | |
|---|---|---|
| EP | 2034389 | 3/2009 |
| EP | 2395446 | 12/2011 |
| WO | WO 2014/153528 | 9/2014 |

OTHER PUBLICATIONS

International Search Report and Written Opinion prepared by the European Patent Office dated Jan. 15, 2016, for International Application No. PCT/EP2015/078399.

International Preliminary Report on Patentability prepared by the European Patent Office dated Oct. 4, 2016, for International Application No. PCT/EP2015/078399.

Second Written Opinion prepared by the European Patent Office dated Oct. 31, 2016, for International Application No. PCT/EP2015/078399.

International Search Report and Written Opinion prepared by the European Patent Office dated Feb. 3, 2016, for International Application No. PCT/EP2015/078401.

International Preliminary Report on Patentability prepared by the European Patent Office dated Oct. 4, 2016, for International Application No. PCT/EP2015/078401.

Second Written Opinion prepared by the European patent Office dated Nov. 4, 2016, for International Application No. PCT/EP2015/078401.

Official Action for U.S. Appl. No. 15/532,674, dated Apr. 16, 2018 11 pages.

Notice of Allowance for U.S. Appl. No. 15/532,674, dated Jul. 31, 2018 9 pages.

Corrected Notice of Allowability for U.S. Appl. No. 15/532,674, dated Oct. 3, 2018 5 pages.

\* cited by examiner

USING SENSOR DATA TO AUTHENTICATE A USER

CROSS REFERENCE TO RELATED APPLICATIONS

This application is a national stage application under 35 U.S.C. 371 and claims the benefit of PCT Application No. PCT/EP2015/078399 having an international filing date of 2 Dec. 2015, which designated the United States, which PCT application claimed the benefit of European Patent Application No. 14196308.2 filed 4 Dec. 2014, the disclosures of each of which are incorporated herein by reference.

TECHNICAL FIELD

The invention relates to conditionally authenticating a user for access to a physical space. In particular, sensor data is used for the authentication.

BACKGROUND

Lock devices and key devices are evolving from the traditional pure mechanical locks. These days, various types of electronic key devices can be used to unlock lock devices. For example, wireless communication such as Bluetooth, RFID (Radio Frequency Identification), NFC (Near Field Communication), etc. can be used to communicate credentials from the key device to the lock device which can thereby grant or deny access.

U.S. Pat. No. 8,593,249 presents a method for unlocking a lock by a lock device enabled for short-range wireless data communication in compliance with a communication standard. In one embodiment, the method includes: a) detecting a key device within operative range of the lock device; b) determining a wireless communication address of the key device; c) evaluating the determined key device address by reference to a data storage with a number of wireless communication addresses stored therein; d) generating an evaluation result from said evaluating step c), wherein a match between the determined key device address and any of the wireless communication addresses stored in the data storage is a requisite for a positive evaluation result; and e) unlocking said lock if a positive evaluation result is generated in step d). However, defining the operative range is difficult and requires careful optimisation. If the operative range is too large, unlocking can inadvertently occur from the inside. If the operative range is too small, it places unnecessary requirements on the user in terms of where to position the key device for access to be granted.

US 2013/0127591 A1 presents a method, system, and computer program product for secure facilities access. The method may include: receiving an access request from a mobile device to a secure facility; authenticating a user using multifactor biometric authentication with data from the mobile device; obtaining data from one or more fixed sensor devices at a location in the physical vicinity of the secure facility; cross-validating data from the mobile device with data from the one or more fixed sensor devices; and granting access to the secure facility if the authentication of the user and the cross-validation are successful. The cross-validating may determine that the access request from the mobile device is made in the vicinity of the secure facility using data from the one or more fixed sensor devices. However, the presented method is complicated and requires sophisticated sensor devices.

SUMMARY

It is an object to improve control of how access control is performed when correlating sensor data.

According to a first aspect it is presented a method for conditionally authenticating a user for access to a physical space. The method is performed in an access control device connected to a physical lock device. The method comprises the steps of: obtaining first sensor data being based on a mobile device sensing a tap of a user; obtaining second sensor data being based on a fixed sensor sensing a tap of a user; determining whether the first sensor data matches the second sensor data by determining whether the first sensor data reflects a tap of the user and corresponds to a tap of the user also reflected in the second sensor data; and sending an unlock signal to the physical lock device when the first sensor data matches the second sensor data.

The method may further comprise the steps of: exchanging digital authentication data with the mobile device; determining whether the mobile device is authenticated based on the digital authentication data. In such a case, the step of sending an unlock signal is only performed when the mobile device is authenticated.

The step of determining whether the first sensor data matches the second data may comprise determining that the first sensor data matches the second data only when a time difference between corresponding taps is less than a threshold time difference.

The method may further comprise the step of: determining whether the first sensor data and the second sensor data match a predefined physical movement. In such a case, the step of sending an unlock signal is only performed when the first sensor data and the second sensor data match the predefined physical movement.

The access control device may comprise the fixed sensor. In such a case, the step of obtaining second sensor data comprises obtaining the second sensor data being based on the fixed sensor sensing a vibration.

In the step of obtaining first sensor data, the first sensor data may be based on accelerometer data.

The step of determining whether the first sensor data matches the second sensor data may comprise determining whether the first sensor data reflects two taps of the user and corresponds to two taps of the user reflected in the second sensor data. In such a case, the first sensor data and the second sensor data may be determined to match only when the time difference between the two taps of the first sensor data corresponds to the time difference between the two taps of the second sensor data.

According to a second aspect it is presented an access control device arranged to conditionally authenticate a user for access to a physical space. The access control device comprises: a processor; and a memory storing instructions that, when executed by the processor, causes the access control device to: obtain first sensor data being based on a mobile device sensing a tap of a user; obtain second sensor data being based on a fixed sensor sensing a tap of a user; determine whether the first sensor data matches the second sensor data by determining whether the first sensor data reflects a tap of the user and corresponds to a tap of the user also reflected in the second sensor data; and send an unlock signal to a physical lock device, connected to the access control device, when the first sensor data matches the second sensor data.

The memory may further store instructions that, when executed by the processor, causes the access control device to: exchange digital authentication data with the mobile device; and determine whether the mobile device is authenticated based on the digital authentication data. In such a case, the instructions to send an unlock signal comprise instructions that, when executed by the processor, causes the access control device to only send the unlock signal when the mobile device is authenticated.

The instructions to determine whether the first sensor data matches the second data may comprise instructions that, when executed by the processor, causes the access control device to determine that the first sensor data matches the second data only when a time difference between corresponding taps is less than a threshold time difference.

The memory may further store instructions that, when executed by the processor, causes the access control device to: determine whether the first sensor data and the second sensor data match a predefined physical movement. In such a case, the instructions to send an unlock signal may comprise instructions that, when executed by the processor, causes the access control device to only send the unlock signal when the first sensor data and the second sensor data match the predefined physical movement.

The access control device may further comprise the fixed sensor, in which case, the instructions to obtain second sensor data comprise instructions that, when executed by the processor, causes the access control device to obtain the second sensor data being based on the fixed sensor sensing a vibration.

The instructions to obtain first sensor data may comprise instructions that, when executed by the processor, causes the access control device to obtain the first sensor data based on accelerometer data.

The instructions to determine whether the first sensor data matches the second sensor data may comprise instructions that, when executed by the processor, causes the access control device to determine whether the first sensor data reflects two taps of the user and corresponds to two taps of the user reflected in the second sensor data, and wherein the first sensor data and the second sensor data are determined to match only when the time difference between the two taps of the first sensor data corresponds to the time difference between the two taps of the second sensor data.

According to a third aspect it is presented a computer program for conditionally authenticating a user for access to a physical space. The computer program comprises computer program code which, when run on a access control device causes the access control device to: obtain first sensor data being based on a mobile device sensing a tap of a user; obtain second sensor data being based on a fixed sensor sensing a tap of a user; determine whether the first sensor data matches the second sensor data by determining whether the first sensor data reflects a tap of the user and corresponds to a tap of the user also reflected in the second sensor data; and send an unlock signal to a physical lock device, connected to the access control device, when the first sensor data matches the second sensor data.

According to a fourth aspect it is presented a computer program product comprising a computer program according to claim the third aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1A:
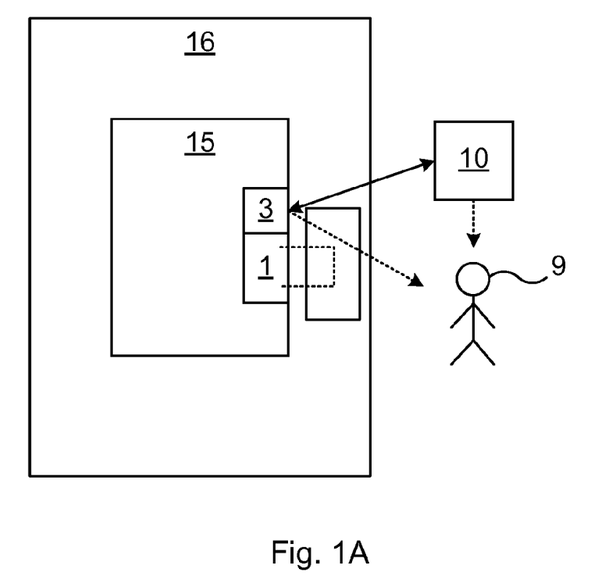
FIGS. 1A-B are schematic diagrams showing environments in which embodiments presented herein can be applied.
Figure 1B:
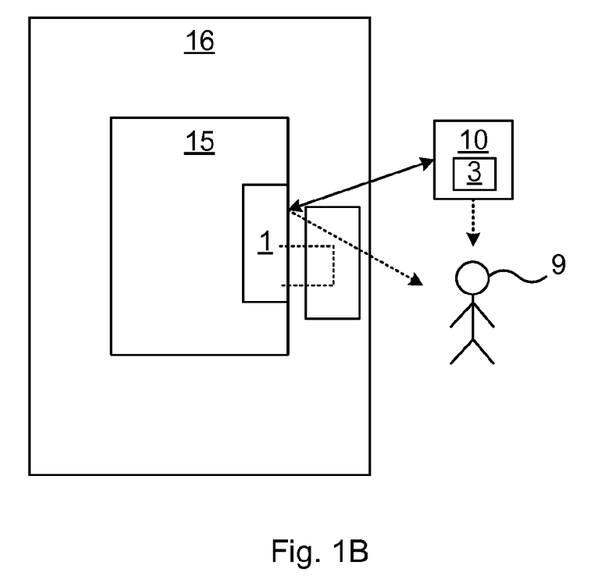

FIGS. 1A-B are schematic diagrams showing environments in which embodiments presented herein can be applied.

Looking first to FIG. 1A, access to a physical space 16 is restricted by a physical barrier 15 which is selectively unlockable. For instance, the barrier 15 can be a door, gate, window, etc. In order to unlock the barrier 15, an access control device 3 is provided. As explained in more detail below, the access control device 3 is connected to a physical lock device 1, which is controllable by the access control device 3 to be set in an unlocked state or locked state. In this embodiment, the access control device 3 is mounted close to the physical lock device 1.

As explained in more detail below, a mobile device 10 comprises a sensor to detect a tap of a user 9. Moreover, there is a fixed sensor to detect the tap of the user 9.

Based on data from both sensors, the access control device 3 can authenticate the user and thus grant or deny access. Once authenticated, valid authorisation can optionally be a condition to grant access.

When access is granted, the access control device 3 sends an unlock signal to the lock device 1, whereby the lock device 1 is set in an unlocked state. In this embodiment, this can e.g. imply a signal over a wire-based communication, e.g. using Universal Serial Bus (USB), Ethernet, or even a simple electric connection (e.g. to the lock device 1), or alternatively a wireless interface. When the lock device 1 is in an unlocked state, the barrier 15 can be opened and when the lock device 1 is in a locked state, the barrier 15 cannot be opened. In this way, access to a closed space 16 is controlled by the access control device 3. It is to be noted that the access control device 3 and/or the lock device 1 can be mounted in the physical barrier 15 (as shown) or in a fixed structure by the physical barrier 15 (not shown).

The embodiment shown in FIG. 1B is similar to the embodiment of FIG. 1A and only differences will be explained now. In FIG. 1B, the access control device 3 is included in the mobile device 10 in the form of software and/or hardware.

Again, the access control device 3 obtains sensor data from both the fixed sensor and the mobile device sensor to determine whether to grant access. If access is granted, the access control device 3 sends an unlock signal to the lock device over the wireless interface between the mobile device 10 and the lock device 1.

Figure 2A:
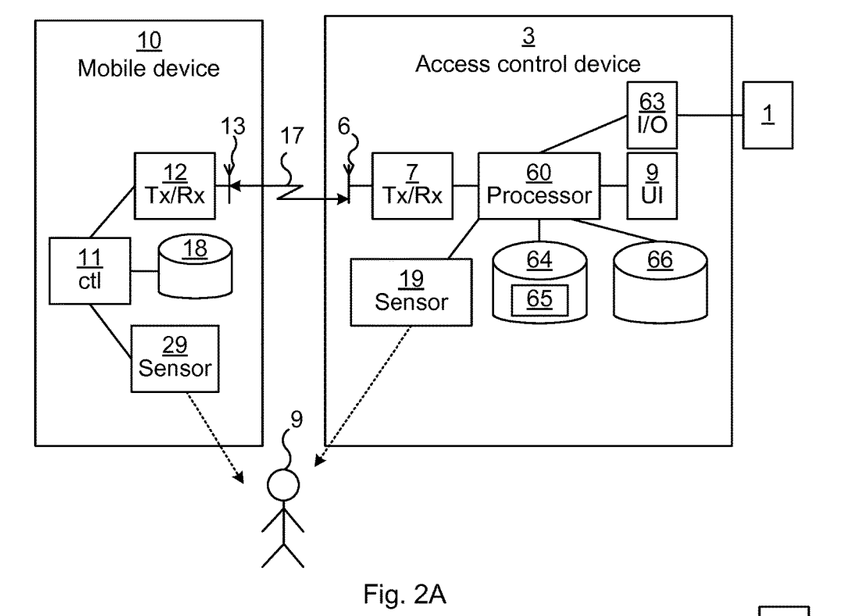
FIGS. 2A-C are schematic diagrams illustrating some components of the mobile device and the lock device of FIG. 1 and how these interact according to different embodiments.
Figure 2B:
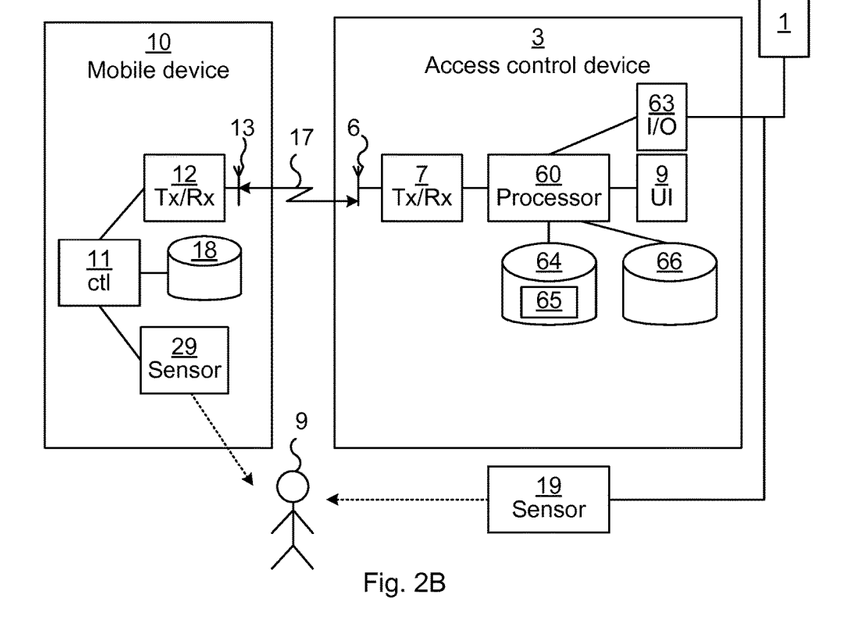
Figure 2C:
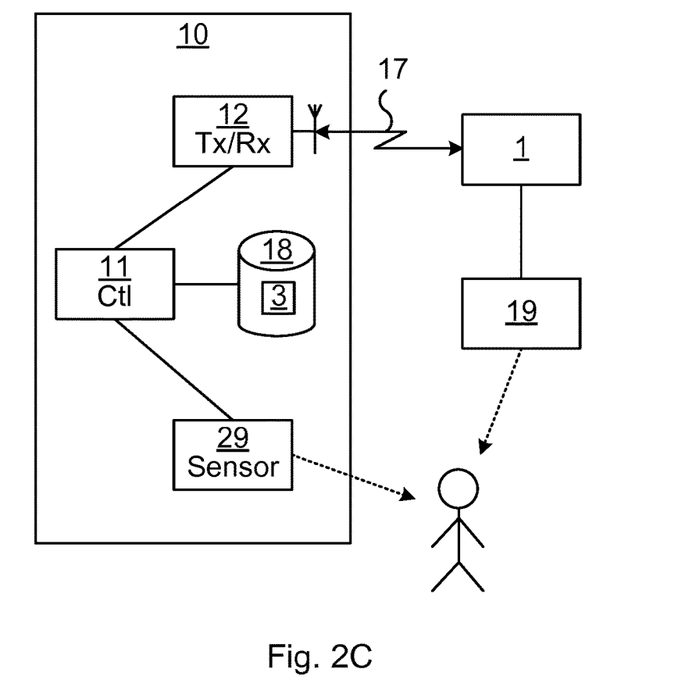

FIGS. 2A-C are schematic diagrams illustrating some components of the mobile device 10, the access control device and the lock device 1 of FIGS. 1A-B and how these interact according to different embodiments.

The mobile device 10 and the access control device 3 interact using a wireless interface 17 so that the access control device 3 can determine whether to grant or deny access. The wireless interface 17 is any suitable current or future wireless interface allowing communication between the mobile device 10 and the access control device 3 and can e.g. be based on Bluetooth, Bluetooth Low Energy (BLE), Radio Frequency Identification (RFID), Near Field Communication (NFC), etc.

The mobile device 10 comprises a transceiver 12 connected to an antenna 13 for the wireless interface 17. Furthermore, the mobile device 10 comprises a controller ii which can be any combination of one or more of a suitable central processing unit (CPU), multiprocessor, microcontroller unit (MCU), digital signal processor (DSP), application specific integrated circuit etc., capable of executing software instructions or otherwise controllable to behave according to predetermined logic. The mobile device 10 may be implemented as a mobile phone, a smartphone, a key fob, credit card shaped device, etc.

A memory 18 is provided which can optionally store credential data of the mobile device 10. The credential data can be used in an authentication process to determine whether the mobile device is authenticated as a condition to be granted access to open a lock. The memory 18 can be any combination of read and write memory (RAM) and read only memory (ROM). The memory 18 may also comprise persistent storage, which, for example, can be any single one or combination of solid state memory, magnetic memory, or optical memory storing a computer program with software instructions.

A mobile device sensor 29 detects at least one aspect of a tap of the user 9 of the mobile device 10.

In one embodiment, the mobile device sensor 29 is implemented using an accelerometer. The accelerometer can detect acceleration, and thus movement, in at least one dimension, and optionally in three dimensions.

In one embodiment, the mobile device sensor 29 is implemented using a camera. The camera can detect movement by capturing images of the user 9 and/or capturing images of the surroundings, and analysing differences in these images over time. The mobile device sensor 29 generates sensor data of which at least a subset is transmitted to the access control device 3 over the wireless interface 17. Optionally, the sensor data is transformed by the processor prior to transmission, e.g. to compress data, to filter the sensor data and/or to transform the data in a suitable format for transmission.

Optionally, the mobile device 10 is a wearable device. When the mobile device 10 is fixed to the user 9, this improves the capability of the mobile device sensor 29 to detect movement of the user 9.

Other components of the mobile device 10, such as user interface components, etc. are omitted here for reasons of clarity.

Looking now to the access control device 3, this comprises a transceiver 7 with a connected antenna 6. The transceiver 7 and the mobile device 10 interact over a wireless interface 17 for sending sensor data from the mobile device 10 and optionally to exchange digital authentication data with the mobile device 10. Optionally, the transceiver 7 and antenna 6 are provided externally from the access control device 3.

A processor 60 controls the general operation of access control device 3. The processor 60 can be any combination of one or more of a suitable central processing unit (CPU), multiprocessor, microcontroller unit (MCU), digital signal processor (DSP), application specific integrated circuit (ASIC) etc., capable of executing software instructions or otherwise configured to behave according to predetermined logic. Hence, the processor 60 can be capable of executing software instructions 65 stored in a memory 64, which can thus be a computer program product. The processor 60 can be configured to execute the method described with reference to FIG. 4 below.

The memory 64 can be any combination of read and write memory (RAM) and read only memory (ROM). The memory 64 also comprises persistent storage, which, for example, can be any single one or combination of magnetic memory, optical memory, solid state memory or even remotely mounted memory.

A data memory 66 is also provided for reading and/or storing data during execution of software instructions in the processor 60, for instance digital authentication data. The data memory 66 can be any combination of read and write memory (RAM) and read only memory (ROM).

The access control device 3 further comprises an I/O interface 63 for communicating with other external entities such as the lock device 1. Such communication may be wire-based, e.g. using Universal Serial Bus (USB), Ethernet, or event a simple electric connection (e.g. to the lock device 1). Alternatively or additionally, the connection can be wireless, e.g. using Bluetooth, BLE, any of the IEEE 802. 11 standards, wireless USB, etc. Optionally, the access control device 3 also includes a user interface, e.g. comprising any one or more of a keypad, light emitting diodes (LED) or other lights, a display (optionally touch sensitive), etc.

Optionally, the access control device 3 is combined with the lock device 1 in a single device.

A fixed sensor 19 detects at least one aspect of a tap of the user 9 of the mobile device 10. The fixed sensor 19 is mounted to a fixed physical structure, but the fixed physical structure is in some cases moveable in a restricted way. For instance, the fixed sensor 19 could be mounted on the physical barrier 15 which can be pivotally or translationally fixed to surrounding structures. In any case, the fixed sensor 19 is not meant to have completely free movement in relation to the physical space 16.

The fixed sensor 19 can be implemented using a vibration sensor. The vibration sensor can detect vibrations and taps by the user. For instance, the vibration sensor can be implemented using an accelerometer. It is sufficient that the tap of the user can be detected; there is no requirement to identify the user based on signals from the fixed sensor. Hence, the fixed sensor 19 can simply be implemented as a vibration sensor or touch sensor. In this way, the costs for the fixed sensor 19 is kept low while still allowing the matching of the tap of the user.

When fixed sensor is a vibration sensor, this allows the user to tap within a large area and still be detected by the vibration sensor.

In one embodiment, the fixed sensor 19 is implemented using a proximity sensor, such as a capacitive touch sensor or IR (infrared) sensor. In this case, the user tap will be registered each time the user touches the sensor. By using a proximity sensor, a greater amount of directivity is achieved. Consequently, someone tapping on the inside would not trigger a tap detection on the outside by the fixed sensor when implemented using a proximity sensor.

In one embodiment, the fixed sensor 19 is implemented using a mechanical switch. As in the case of the proximity sensor, a greater amount of directivity is achieved with the mechanical switch, e.g. compared with the vibration sensor.

In one embodiment, the fixed sensor 19 is implemented by a sensor capable of sensing the user turning a handle. This sensor can e.g. be implemented to detect any motion resulting from handle movement, e.g. a rotational movement of a handle shaft, a bolt movement, etc.

Other components of the access control device 3 are omitted in order not to obscure the concepts presented herein.

In FIG. 2B, an embodiment is shown which is similar to the embodiment of FIG. 2A. Here, however, the access control device 3 does not comprise any internal sensor, but is instead connect to an external sensor 19 via the I/O interface 63.

In FIG. 2C, the access control device 3 is implemented using software instructions 3 stored in the persistent memory 18 of the mobile device. This embodiment corresponds to the embodiment shown in FIG. 1B.

Here, the mobile device 10 communicates with the lock device 1 e.g. to be able to send an unlock signal when access is granted.

The access control device 3 obtains sensor data from both the mobile device sensor 29 and the fixed sensor 19 and matches the sensor data as part of the process to grant access.

The fixed sensor 19 can communicate with the mobile device 10 and thus the access control device 3 over the wireless interface either as shown, via the lock device 1, or using a direct wireless link between the fixed sensor 19 and the mobile device 10.

Figure 3:
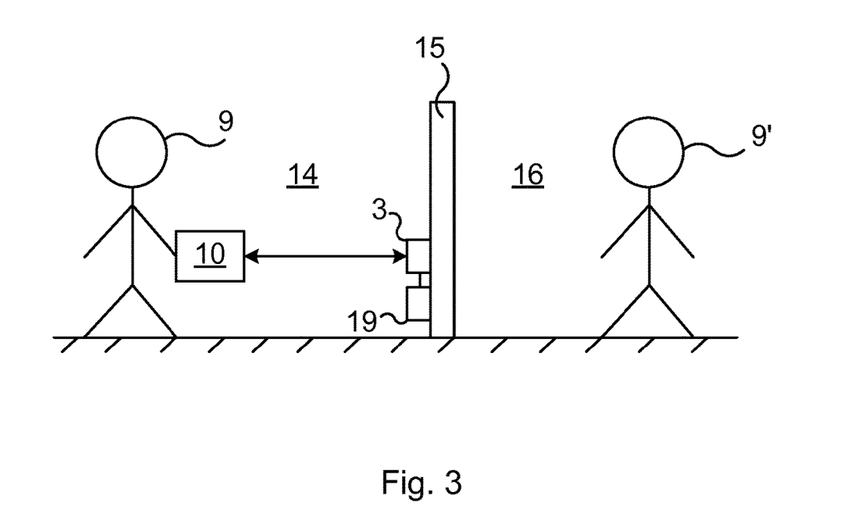
FIG. 3 is a schematic diagram illustrating a side view of the environment of FIG. 1.

FIG. 3 is a schematic diagram illustrating a side view of the environment of FIG. 1A. It is here seen how the physical barrier 15 is a border between a first space 14 and a second space 16. As described above, the access control device 3 controls access by the user 9 to the physical space 16.

By placing the fixed sensor 19 (internal or external) of the access control device 3 in the first space 14, the fixed sensor 19 can easier the tap of the user 9. Significantly, the fixed sensor 19 can thereby be prevented from detecting the tap of a second user 9' in the second space 16. In this way, the access control device 3 can prevent from granting access and unlocking the physical barrier 15 based on user action in the second space. For instance, when the second space 16 is an internal space, access control may not be needed towards the first space 14 and the lock device can be opened, e.g. using a push button or similar. Using embodiments presented herein, the operative range can easily be defined to be only on one side of the physical barrier 15.

If needed, a sensor can also, or alternatively, be provided in the second space 16 to allow the access control device 3 to detect user movements in the second space.

It is to be noted that the access control device 3 could also be implemented using the mobile device 10 as described above.

Figure 4:
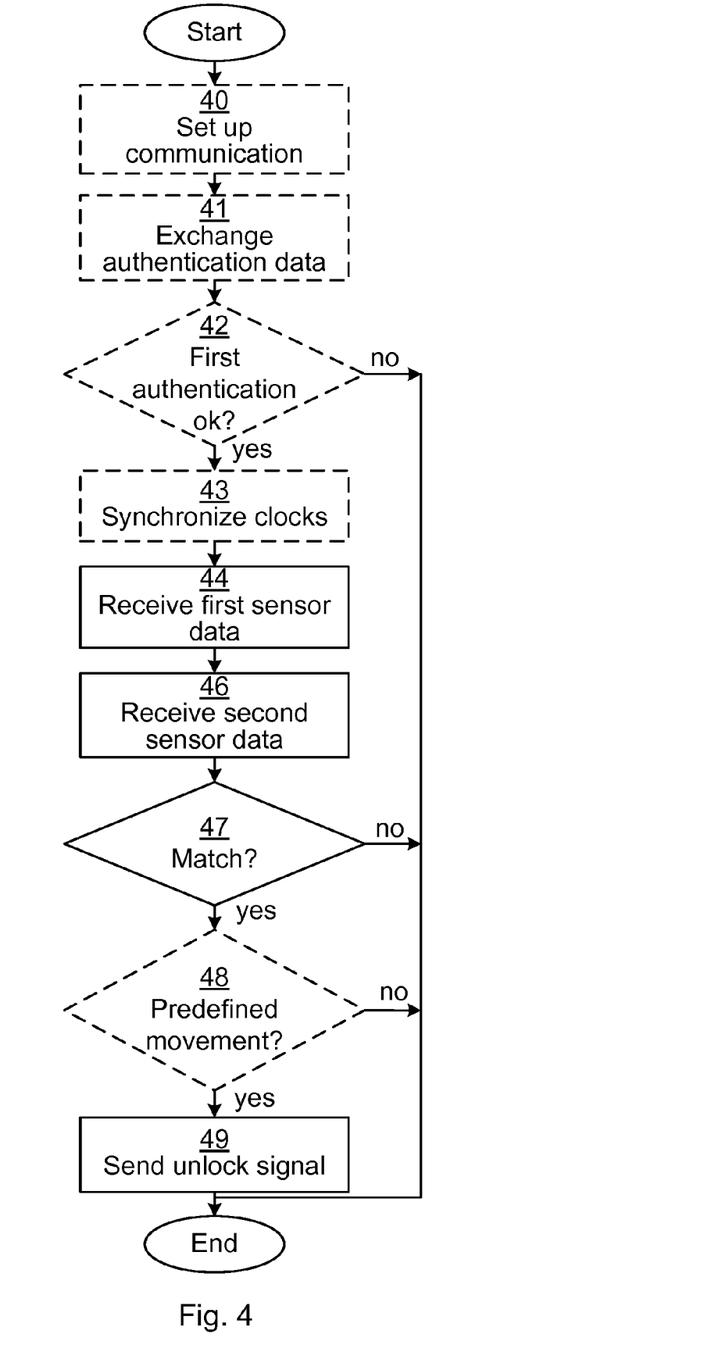
FIG. 4 is a flow chart illustrating embodiments of methods performed in the access control device of FIGS. 1A-B, FIGS. 2A-C or FIG. 3 for conditionally authenticating a user for access to a physical space.

FIG. 4 is a flow chart illustrating embodiments of methods performed in the access control device 3 of FIGS. 1A-B, FIGS. 2A-C or FIG. 3 for conditionally authenticating a user for access to a physical space.

The method can be started periodically or when proximity of a user is detected.

In an optional set up communication step 40, the wireless interface (17 of FIG. 2B) is established. Alternatively, the wireless interface has been set up prior to starting the method, in which case this step does not need to be performed.

In an optional exchange authentication data step 41, digital authentication data is exchanged with the mobile device. This can e.g. comprise a challenge and response communication, where the access control device sends a challenge to the mobile device and the mobile device sends a response. The challenge and response communication could also occur in the reverse direction.

In an optional conditional first authentication ok step 42, the access control device determines whether the mobile device is authenticated based on the digital authentication data. For instance, this can comprise the checking of the response with an expected result in a challenge and response procedure. When the mobile device is authenticated, the method proceeds to the synchronise clocks step 43. Otherwise, the method ends.

In an optional synchronise clocks step 43, the time lines of sensor data from the fixed sensor and sensor data from the mobile device sensor are synchronised. This can e.g. involve finding a common time reference.

Alternatively, the time synchronisation can occur by process where the two sides exchange their times to thereby obtain cross references to the corresponding times.

In the obtain first sensor data step 44, first sensor data is obtained. The first sensor data is based on the mobile device sensing a tap of a user using the mobile device sensor. The first sensor data can e.g. contain samples of an analogue signal detected by the mobile device sensor. In one embodiment, the first sensor data is based on accelerometer data.

When the access control device is implemented on the fixed side, i.e. when implemented in the vicinity of the lock device and the physical barrier (e.g. as illustrated in FIG. 1A and FIGS. 2A-B), the obtaining of first sensor data comprises receiving the first sensor data from the mobile device over the wireless interface (17 of FIGS. 2A-B).

When the access control device is implemented on the mobile device side, the obtaining of first sensor data comprises receiving the first sensor data from the mobile device sensor 29. The first sensor data can then be received as a signal from the mobile device sensor or by reading a memory accessible to both the mobile device sensor and the access control device, implemented using software instructions executing in the processor.

In an obtain second sensor data step 46, second sensor data is obtained. The second sensor data is based on a fixed sensor sensing a tap of a user. The second sensor data can e.g. contain samples of an analogue signal detected by the fixed sensor. In one embodiment, the second sensor data is based on the fixed sensor sensing a vibration.

When the access control device is implemented on the fixed side, the obtaining of second sensor data comprises receiving the second sensor data from the fixed sensor 19. The second sensor data can then be received as a signal from the fixed sensor or by reading a memory accessible to both the fixed sensor and the access control device.

When the access control device is implemented on the mobile device side, the obtaining of second sensor data comprises receiving the second sensor data from the fixed sensor over the wireless interface (17 of FIG. 2C).

It is to be noted that the first sensor data and the second sensor data overlap in time to allow matching to be performed.

In a conditional match step 47, the access control device 3 determines whether the first sensor data matches the second sensor data. Optionally, a time difference is considered, such that a match between the first sensor data matches the second data only occurs when a time difference between corresponding taps is less than a threshold time difference. Such a time difference can e.g. be 100 milliseconds. The time difference may require a synchronisation of a time scale for the first sensor data and for the second sensor data. Alternatively, the times at which the first sensor data and the second sensor data is obtained are used as reference points for the comparison in time.

Optionally, this step comprises determining whether the first sensor data reflects a tap of the user and corresponds to a tap of the user also reflected in the second sensor data. A tap is a simple user action which is easy to detect with the fixed sensor. A tap is to be interpreted as any distinct physical contact (optionally with intermediate clothing, etc.) of a user with the fixed structure connected to the fixed sensor. Hence, the tap could also be in the form of a touch, knock, a bump, a door handle turn, etc.

Optionally, this step comprises determining whether the first sensor data reflects two taps of the user and corresponds to two taps of the user reflected in the second sensor data. In such a case, the first sensor data and the second sensor data are determined to match only when the time difference between the two taps of the first sensor data corresponds to the time difference between the two taps of the second sensor data. Corresponds is here to be interpreted as a being equal to each other, within a margin of error (e.g. 10 ms). When using two taps, the time sync of the clocks of the two sensors do not have to be so precise since the time between taps can use relative time. In other words, a match is determined when the same taps are found in the first sensor data and the second sensor data, which is determined by comparing the respective time differences between the two taps.

FIG. 5A-E illustrate various embodiments of this matching and is described in more detail below.

When a match is determined, the method proceeds to a send unlock signal step 49. Alternatively, when a match is determined, the method proceeds to an optional conditional predefined movement step 48. When no match is determined, the method ends.

In the optional conditional predefined movement step 48, it is determined whether the first sensor data and the second sensor data match a predefined physical movement such as defined number of taps or a specific hand (or body) gesture. When the predefined physical movement is matched, the method proceeds to the send unlock signal. Otherwise, the method ends.

In a send unlock signal step 49, an unlock signal is sent to the physical lock device. In this way, the physical lock device is set into an unlocked state, allowing access for the user to the physical space.

Using this method, a user movement is detected using both the mobile device sensor and the fixed sensor and access is only granted if the movement matches. As illustrated in FIG. 3, this also allows access control to be restricted of only one side of a barrier.

It is to be noted that the order in which the first sensor data and the second data is obtained (in steps 44 and 46) is not important. However, the first sensor data and the second data need to relate to overlapping time periods in order to perform the matching. In one embodiment, the first sensor data and the second sensor data are both obtained in parallel. Optionally, the matching (step 47) is performed in parallel with the obtaining of sensor data (steps 44 and 46). Alternatively, the matching can be performed repetitively on chunks of the first sensor data and the second sensor data, optionally combined with a certain amount of historic data.

In one embodiment, the collection of sensor data is stopped prior to sending the sensor data to the access control device, which is obtained in steps 44 and 46. The collection of sensor data can e.g. be stopped when the mobile device or a device (such as the access control device) connected to the fixed sensor recognises a predetermined motion from the sensor data. Alternatively or additionally, the collection of sensor data can be stopped when there is a sufficient signal level over a specified time of the sensor data. Alternatively or additionally, the collection of sensor data can be stopped when an additional sensor detects user proximity, e.g. using a touch sensor in a handle of the barrier, a separate push button, an infrared sensor, etc.

A number of embodiments will now be described to illustrate the flexibility and applicability of embodiments of the method of FIG. 4.

In one embodiment, the mobile device is a mobile phone or key fob. The mobile device sensor is an accelerometer and the fixed sensor also comprises an accelerometer. To gain access, the user simply taps the mobile phone in the proximity of the fixed sensor. Both sensors detect the tap as a peak in vibration which results in a positive match between the first sensor data and the second sensor data.

In one embodiment, the mobile device is a wearable device, e.g. in the form of an armband, watch or a ring. The mobile device sensor is an accelerometer and the fixed sensor also comprises an accelerometer. To gain access, the user taps a hand or finger located on the same limb as the mobile device in the in the proximity of the fixed sensor. The mobile device sensor senses the vibration propagated trough the body and the fixed sensor also detects the vibration. Both sensors detect the tap as a peak in vibration which, resulting in a positive match between the first sensor data and the second sensor data. Optionally, the sensor data of the mobile device sensor is only used in one dimension. This one dimension can be the dimension where the vibration is strongest.

When the conditional predefined movement step 48 is performed, only predefined movements result in a positive match, which increases the sense of control of the user. For instance, when the predefined movement is three taps within a certain amount of time, the user needs to perform this action to unlock the lock device.

When the steps 41 and 42 of the first authentication is performed, the operative range of this can be large which increases usability, since there is also a second factor authentication using the sensor data from two sources.

FIGS. 5A-E are schematic diagrams illustrating embodiments of how the matching performed in the conditional match step 47 of the flow chart of FIG. 4 can be implemented. There is here a first signal 81 plotted comprising the first sensor data, originating from the mobile device sensor, and a second signal 82 plotted for the second sensor data, originating from the fixed sensor. It is to be noted that it is not important here which signal is which as long as they are matched. The horizontal axis represents time and the vertical axis represents an amplitude of the respective signal levels.

Figure 5A:
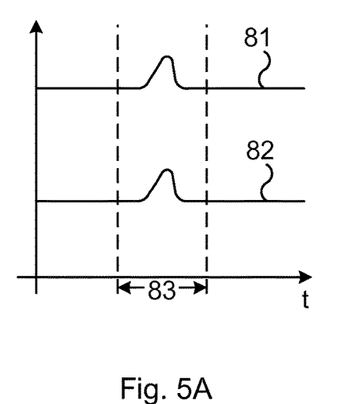
FIGS. 5A-E are schematic diagrams illustrating embodiments of how the matching performed in the flow chart of FIG. 4 can be implemented.

In FIG. 5A, there is a time window 83 on which the first sensor data and the second sensor data is based. In other words, the first sensor data and the second sensor data may be limited in time to the time window 83. There is here a single peak in the first signal 81 and a single peak in the second signal 82. The peaks occur around the same time, resulting in a match. This situation can e.g. occur when the user taps his hand in proximity of the fixed sensor given that the mobile sensor is sensing hand movement.

Figure 5B:
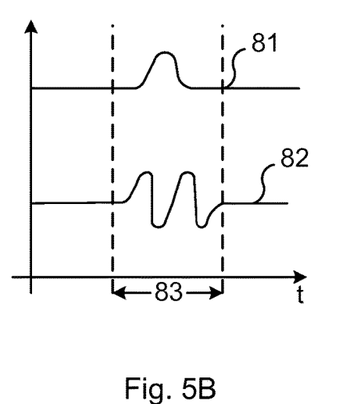

In FIG. 5B, there a single peak in the first signal 81 and a double peak in the second signal 82. The peaks occur around the same time but do not correspond in shape, resulting in a non-match. This situation can e.g. occur for uncorrelated sensor signals.

The difference between the scenarios of FIGS. 5A and 5B can be determined by correlating the first sensor data (of the first signal 81) and the second sensor data (of the second signal 82). When the correlation is greater than a predefined threshold, this results in a match. Using the correlation matching illustrated in FIGS. 5A-B, no prior knowledge of expected movement is necessary; as long as there is sufficient correlation between movements captured by the two sensors, there is a match.

Figure 5C:
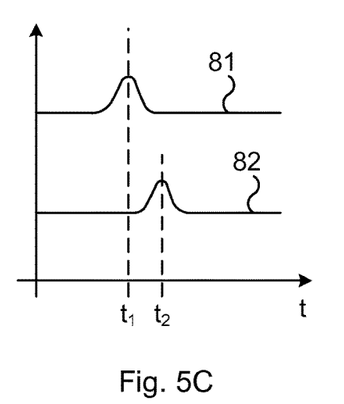

In FIG. 5C, there a single peak at time $t_1$ in the first signal 81 and a single peak at time $t_2$ in the second signal 82. The peaks are not at the same exact time, but occur less than a threshold time difference from each other, resulting in a match.

Figure 5D:
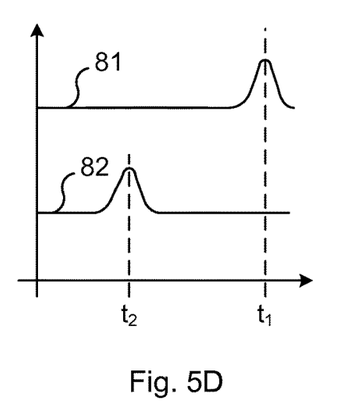

In FIG. 5D, there a single peak at time $t_1$ in the first signal 81 and a single peak at time $t_2$ in the second signal 82. Here the peaks are significantly displaced in time, resulting in a non-match.

FIGS. 5C-D illustrate that the first sensor data is determined to match the second data only when a time difference between corresponding taps is less than a threshold time difference.

The time difference matching is can be combined by comparing with predefined movement (step 49 of FIG. 4).

Figure 5E:
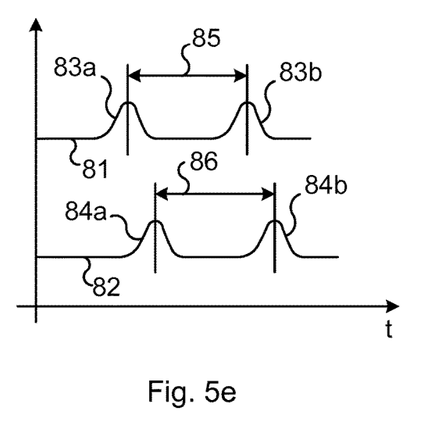

In FIG. 5E, there are two peaks 83*a-b* in the first signal 81. The two peaks 83*a-b* of the first signal 81 correspond to respective taps of the user. Also, there are two peaks 84*a-b* in the second signal 82. The two peaks 84*a-b* of the second signal 82 correspond to respective taps of the user. A first time difference 85 between the two peaks 83*a-b* of the first signal is determined. A second time difference 86 between the two peaks 84*a-b* of the second signal is determined.

The presence of a match or not can then be determined by comparing the first time difference 85 and the second time difference 86. These are considered to correspond to each other when they are equal, within a margin of error. The margin of error can e.g. be +−10 ms or even less, such as 1 ms.

Optionally, the time difference between the first peaks of the first signal 81 and the second signal 82 also need to be within a threshold, to further increase security.

When the first peaks are not compared in time, the time base of the two signals do not need to be synchronised, since only the peak time difference is compared between signals, not the timings themselves. Also, each time difference 85, 86 can be calculated with great accuracy since it only depends on a single respective signal 81, 82. The two tap scenario of FIG. 5E can be required for the match to occur. Optionally, the two tap scenario of FIG. 5E is only applied if a single tap (e.g. in FIG. 5D) results in a non-match, after which the user performs a second tap. The first peak of each signal is then used as the first peak 83*a*, 84*a* of the scenario shown in FIG. 5E. In this way, the requirements on a single tap can be stricter to prevent incorrect determinations of match, since the two tap scenario can be applied with great accuracy which reduces the risk of false positive matches.

Figure 6:
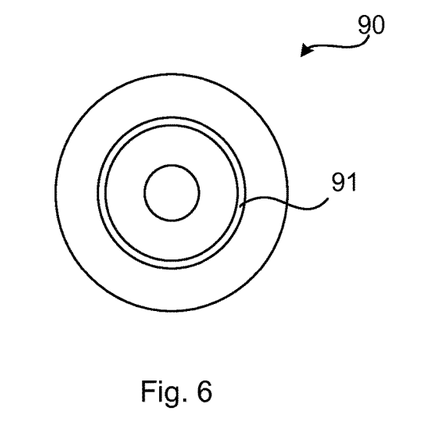
FIG. 6 shows one example of a computer program product comprising computer readable means.

FIG. 6 shows one example of a computer program product comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIGS. 2A-B or the computer program product 18 of FIG. 2C. While the computer program 91 is here schematically shown as a track on the depicted optical disk, the computer program can be stored in any way which is suitable for the computer program product, such as a removable solid state memory, e.g. a Universal Serial Bus (USB) drive.

Here now follows a list of embodiments enumerated with roman numerals.

i. A method for conditionally authenticating a user for access to a physical space, the method being performed in an access control device connected to a physical lock device, the method comprising the steps of:

obtaining first sensor data being based on a mobile device sensing a physical movement of a user;

obtaining second sensor data being based on a fixed sensor sensing a physical movement of a user;

determining whether the first sensor data matches the second sensor data; and sending an unlock signal to the physical lock device when the first sensor data matches the second sensor data.

ii. The method according to embodiment i, further comprising the steps of:

exchanging digital authentication data with the mobile device;

determining whether the mobile device is authenticated based on the digital authentication data; and wherein the step of sending an unlock signal is only performed when the mobile device is authenticated.

iii. The method according to embodiment i or ii, wherein the step of determining whether the first sensor data matches the second data comprises determining that the first sensor data matches the second data only when a time difference between corresponding physical movements is less than a threshold time difference.

iv. The method according to any one of the preceding embodiments, further comprising the step of:

determining whether the first sensor data and the second sensor data match a predefined physical movement; and wherein the step of sending an unlock signal is only performed when the first sensor data and the second sensor data match the predefined physical movement.

v. The method according to any one of the preceding embodiments, wherein the access control device comprises the fixed sensor, and wherein the step of obtaining second sensor data comprises obtaining the second sensor data being based on the fixed sensor sensing a vibration.

vi. The method according to any one of the preceding embodiments, wherein in the step of obtaining first sensor data, the first sensor data is based on accelerometer data.

vii. An access control device arranged to conditionally authenticate a user for access to a physical space, the access control device comprising:
   a processor; and
   a memory storing instructions that, when executed by the processor, causes the access control device to:
      obtain first sensor data being based on a mobile device sensing a physical movement of a user;
      obtain second sensor data being based on a fixed sensor sensing a physical movement of a user;
      determine whether the first sensor data matches the second sensor data; and
      send an unlock signal to a physical lock device, connected to the access control device, when the first sensor data matches the second sensor data.

viii. The access control device according to embodiment vii, wherein the memory further stores instructions that, when executed by the processor, causes the access control device to:
   exchange digital authentication data with the mobile device;
   determine whether the mobile device is authenticated based on the digital authentication data; and
   wherein the instructions to send an unlock signal comprise instructions that, when executed by the processor, causes the access control device to only send the unlock signal when the mobile device is authenticated.

ix. The access control device according to embodiment vii or viii, wherein the instructions to determine whether the first sensor data matches the second data comprise instructions that, when executed by the processor, causes the access control device to determine that the first sensor data matches the second data only when a time difference between corresponding physical movements is less than a threshold time difference.

x. The access control device according to any one of embodiments vii to ix, wherein the memory further stores instructions that, when executed by the processor, causes the access control device to:
   determine whether the first sensor data and the second sensor data match a predefined physical movement; and
   wherein the instructions to send an unlock signal comprise instructions that, when executed by the processor, causes the access control device to only send the unlock signal when the first sensor data and the second sensor data match the predefined physical movement.

xi. The access control device according to any one of embodiments vii to x, further comprising the fixed sensor, and wherein the instructions to obtain second sensor data comprise instructions that, when executed by the processor, causes the access control device to obtain the second sensor data being based on the fixed sensor sensing a vibration.

xii. The access control device according to any one of embodiments vii to xi, wherein the instructions to obtain first sensor data comprise instructions that, when executed by the processor, causes the access control device to obtain the first sensor data based on accelerometer data.

xiii. A computer program for conditionally authenticating a user for access to a physical space, the computer program comprising computer program code which, when run on a access control device causes the access control device to:
   obtain first sensor data being based on a mobile device sensing a physical movement of a user;
   obtain second sensor data being based on a fixed sensor sensing a physical movement of a user;
   determine whether the first sensor data matches the second sensor data; and
   send an unlock signal to a physical lock device, connected to the access control device, when the first sensor data matches the second sensor data.

xiv. A computer program product comprising a computer program according to embodiment xiii and a computer readable means on which the computer program is stored.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for conditionally authenticating a user for access to a physical space, the method being performed in an access control device connected to a physical lock device, the method comprising:
   obtaining first sensor data being based on a mobile device sensing a tap of a user;
   obtaining second sensor data being based on a fixed sensor sensing a tap of a user;
   determining whether the first sensor data matches the second sensor data, wherein the first sensor data matches the second data only when a time difference between corresponding taps is less than a threshold time difference; and
   sending an unlock signal to the physical lock device when the first sensor data matches the second sensor data.

2. The method according to claim 1, further comprising the steps of:
   exchanging digital authentication data with the mobile device; and
   determining whether the mobile device is authenticated based on the digital authentication data;
   and wherein the step of sending an unlock signal is only performed when the mobile device is authenticated.

3. The method according to claim 1, further comprising the step of:
   determining whether the first sensor data and the second sensor data match a predefined physical movement; and
   wherein the step of sending an unlock signal is only performed when the first sensor data and the second sensor data match the predefined physical movement.

4. The method according to claim 1, wherein the access control device comprises the fixed sensor, and wherein the step of obtaining second sensor data comprises obtaining the second sensor data being based on the fixed sensor sensing a vibration.

5. The method according to claim 1, wherein in the step of obtaining first sensor data, the first sensor data is based on accelerometer data.

6. The method according to claim 1, wherein the step of determining whether the first sensor data matches the second sensor data comprises determining whether the first sensor data reflects two taps of the user and corresponds to two taps of the user reflected in the second sensor data, and wherein the first sensor data and the second sensor data are determined to match only when the time difference between the two taps of the first sensor data corresponds to the time difference between the two taps of the second sensor data.

7. An access control device arranged to conditionally authenticate a user for access to a physical space, the access control device comprising:

a processor; and a memory storing instructions that, when executed by the processor, causes the access control device to:

obtain first sensor data being based on a mobile device sensing a tap of a user;

obtain second sensor data being based on a fixed sensor sensing a tap of a user;

determine whether the first sensor data matches the second sensor data, wherein the first sensor data matches the second data only when a time difference between corresponding taps is less than a threshold time difference; and send an unlock signal to a physical lock device, connected to the access control device, when the first sensor data matches the second sensor data.

8. The access control device according to claim 7, wherein the memory further stores instructions that, when executed by the processor, causes the access control device to:

exchange digital authentication data with the mobile device; and determine whether the mobile device is authenticated based on the digital authentication data;

and wherein the instructions to send an unlock signal comprise instructions that, when executed by the processor, causes the access control device to only send the unlock signal when the mobile device is authenticated.

9. The access control device according to claim 7, wherein the memory further stores instructions that, when executed by the processor, causes the access control device to:

determine whether the first sensor data and the second sensor data match a predefined physical movement; and wherein the instructions to send an unlock signal comprise instructions that, when executed by the processor, causes the access control device to only send the unlock signal when the first sensor data and the second sensor data match the predefined physical movement.

10. The access control device according to claim 7, further comprising the fixed sensor, and wherein the instructions to obtain second sensor data comprise instructions that, when executed by the processor, causes the access control device to obtain the second sensor data being based on the fixed sensor sensing a vibration.

11. The access control device according to claim 7, wherein the instructions to obtain first sensor data comprise instructions that, when executed by the processor, causes the access control device to obtain the first sensor data based on accelerometer data.

12. The access control device according to claim 7, wherein the instructions to determine whether the first sensor data matches the second sensor data comprise instructions that, when executed by the processor, causes the access control device to determine whether the first sensor data reflects two taps of the user and corresponds to two taps of the user reflected in the second sensor data, and wherein the first sensor data and the second sensor data are determined to match only when the time difference between the two taps of the first sensor data corresponds to the time difference between the two taps of the second sensor data.

13. A non-transitory computer readable means having a computer program stored thereon, the computer program for conditionally authenticating a user for access to a physical space, the computer program comprising computer program code which, when run on a access control device causes the access control device to:

obtain first sensor data being based on a mobile device sensing a tap of a user;

obtain second sensor data being based on a fixed sensor sensing a tap of a user;

determine whether the first sensor data matches the second sensor data, wherein the first sensor data matches the second data only when a time difference between corresponding taps is less than a threshold time difference; and send an unlock signal to a physical lock device, connected to the access control device, when the first sensor data matches the second sensor data.

14. A computer program product comprising the non-transitory computer readable means according to claim 13 a non-transitory computer program according to claim 13 and a computer readable means on which the computer program is stored.

* * * * *

UNITED STATES PATENT AND TRADEMARK OFFICE
CERTIFICATE OF CORRECTION

PATENT NO. : 10,152,838 B2
APPLICATION NO. : 15/532652
DATED : December 11, 2018
INVENTOR(S) : Fredrik Einberg

Page 1 of 1

It is certified that error appears in the above-identified patent and that said Letters Patent is hereby corrected as shown below:

In the Claims

Column 16, Line 36: REPLACE "A computer program product comprising the non-transitory computer readable means according to claim 13 a non-transitory computer program according to claim 13 and a computer readable means on which the computer program is stored" with "A computer program product comprising the non-transitory computer readable means according to claim 13."

Signed and Sealed this
Nineteenth Day of March, 2019

Andrei Iancu
*Director of the United States Patent and Trademark Office*